(12) United States Patent
Anasta et al.

(10) Patent No.: US 11,736,896 B2
(45) Date of Patent: *Aug. 22, 2023

(54) METHODS AND SYSTEMS FOR GENERATING LOCATION-BASED GUIDANCE BASED ON INTERIOR CONDITIONS AT A PLURALITY OF LOCATIONS

(71) Applicant: Capital One Services, LLC, McLean, VA (US)

(72) Inventors: Jude Anasta, Hudson, NY (US); Claudia Yee, Annadale, VA (US); Alan Master, Elkton, MD (US); Tsanyo Tsanev, New York, NY (US); Jason Jobe, Frederick, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,491

(22) Filed: Aug. 30, 2022

(65) Prior Publication Data
US 2022/0417705 A1   Dec. 29, 2022

Related U.S. Application Data (63) Continuation of application No. 16/909,457, filed on Jun. 23, 2020, now Pat. No. 11,477,607.

(51) Int. Cl.
*H04W 4/02* (2018.01)
*H04W 4/024* (2018.01)
*H04W 4/021* (2018.01)
*G06Q 10/047* (2023.01)

(52) U.S. Cl.
CPC .......... *H04W 4/024* (2018.02); *G06Q 10/047* (2013.01); *H04W 4/021* (2013.01)

(58) Field of Classification Search
CPC ..... H04W 4/021; H04W 4/024; G06Q 10/047
USPC ............................ 455/456.1–456.3; 701/434
See application file for complete search history.

(56) References Cited

U.S. PATENT DOCUMENTS

2021/0032822 A1* 2/2021 Balogh ................. E01F 13/022

* cited by examiner

Primary Examiner — Joel Ajayi
(74) Attorney, Agent, or Firm — Perkins Coie LLP (57) ABSTRACT

Methods and systems are discussed for location-based guidance based on interior conditions at a plurality of locations. For example, the system may receive, from a user device of a user, a user request to access a first service. The system may retrieve a plurality of locations that provide the first service. The system may retrieve an average density for respective first queuing areas at each of the plurality of locations at a first time interval, wherein the respective first queuing areas correspond to respective portions at each of the plurality of locations reserved for queuing users for the first service. The system may determine whether the average density for the respective first queuing areas at each of the plurality of locations at the first time interval exceeds a threshold average density. The system may, in response to determining a subset of the plurality of locations where the average density for the respective first queuing areas at the first time interval exceed the threshold average density, generate for display, on the user device, a recommendation for a location from the subset at which to access the first service at the first time interval.

20 Claims, 5 Drawing Sheets

METHODS AND SYSTEMS FOR GENERATING LOCATION-BASED GUIDANCE BASED ON INTERIOR CONDITIONS AT A PLURALITY OF LOCATIONS

CROSS REFERENCE TO RELATED APPLICATIONS

This application is a continuation of U.S. patent application Ser. No. 16/909,457 filed on Jun. 23, 2020. The contents of which are hereby incorporated by reference in its entirety.

FIELD OF THE INVENTION

The invention relates to generating location-based guidance based on interior conditions at a plurality of locations.

BACKGROUND

Users are routinely using mobile applications and services. However, in some instances, services needed by a user require in-person interactions and/or require a user to visit a given location. To help supplement these in-person interactions and/or lessen the burden of location visits, some mobile applications provide directions to the location and/or provide remote appointment scheduling. However, as the number of mobile applications increases, an underlying infrastructure problem has been created. Namely, to provide different functions, mobile applications typically rely on the services of other applications and services. For example, while a user may use a remote appointment scheduling application to schedule an appoint, the system in conventional systems would then need to enter an address of the location into a separate application to receive directions.

SUMMARY

In view of these problems, methods and systems are discussed herein for improved location-based guidance. For example, the methods and system discussed herein provide location-based guidance based on interior conditions at a plurality of locations. Not only does this integration improve over the problems inherent with conventional system, the methods and system provide advantages not contemplated by, or available through, a combination of the conventional system. For example, the COVID-19 pandemic of 2020 raised new issues and concerns with regards to social distancing (i.e., the act of maintaining an appropriate distance from other people). The need for social distancing caused a unique problem for services that needed to be performed in-person or at a given location where the activities and/or presence of other users may affect the ability of the user to maintain a proper social distance.

This is problematic at locations where multiple users may need to visit and each user may require a different service (e.g., corresponding to a different wait time, performance time, queue, etc.). This is especially problematic where users may need to visit a location with a mix of automated and in-person services. For example, a typical bank branch provides a plurality of services such as automated services (e.g., withdrawals from ATMs) and in-person services (e.g., applications for home loans, refinancing discussions, etc.), each type of service associated with a different social distancing requirement (or lack thereof in the case of automated services).

Conventional remote appointment scheduling applications failed to provide a solution to these problems because conventional remote appointment scheduling applications are based on allowing users to select an appointment time from available appointment times. Such appointments, while potentially effective in managing the flow of in-person services, do not take into account other types of services that may be occurring at the location (e.g., the automated services). Likewise, such conventional remote appointment scheduling applications are unable to account for "walk-in" users (e.g., users that arrive without a scheduled appointment) or users that miss or arrive outside an appointment window. In fact, this only exacerbates issues with social distancing as it causes more users to wait in queues, often at close distances. The methods and system provided herein improve upon the conventional remote appointment scheduling applications by providing location-based guidance according to a density at a given location as opposed to relying on appointment scheduling. For example, the methods and systems factor in users already at a location and/or waiting for a service, including automated services. By using location density, as opposed to conventional appointment systems, the methods and systems provide a solution to social distancing issues.

Furthermore, the methods and systems further manage location density by providing recommendations prior to users arriving. That is, the methods and systems prevent social distancing issues being created by users waiting for a service. The methods and systems provide this functionality by determining interior conditions (e.g., average density at a plurality of locations offering a requested service) and providing location recommendations to a user based on these interior conditions. This functionality is not available in conventional remote appointment scheduling applications as the underlying infrastructure of mobile applications does not allow remote appointment scheduling applications to receive information on interior conditions and/or provide directions to an appropriate location.

In some aspects, systems and methods for generating location-based guidance based on interior density conditions at a plurality of locations are provided. For example, the system may receive, from a user device of a user, a user request to access a first service. The system may retrieve a plurality of locations that provide the first service. The system may retrieve an average density for respective first queuing areas at each of the plurality of locations at a first time interval, wherein the respective first queuing areas correspond to respective portions at each of the plurality of locations reserved for queuing users for the first service. The system may determine whether the average density for the respective first queuing areas at each of the plurality of locations at the first time interval exceeds a threshold average density. The system may, in response to determining a subset of the plurality of locations where the average density for the respective first queuing areas at the first time interval exceed the threshold average density, generate for display, on the user device, a recommendation for a location from the subset at which to access the first service at the first time interval.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
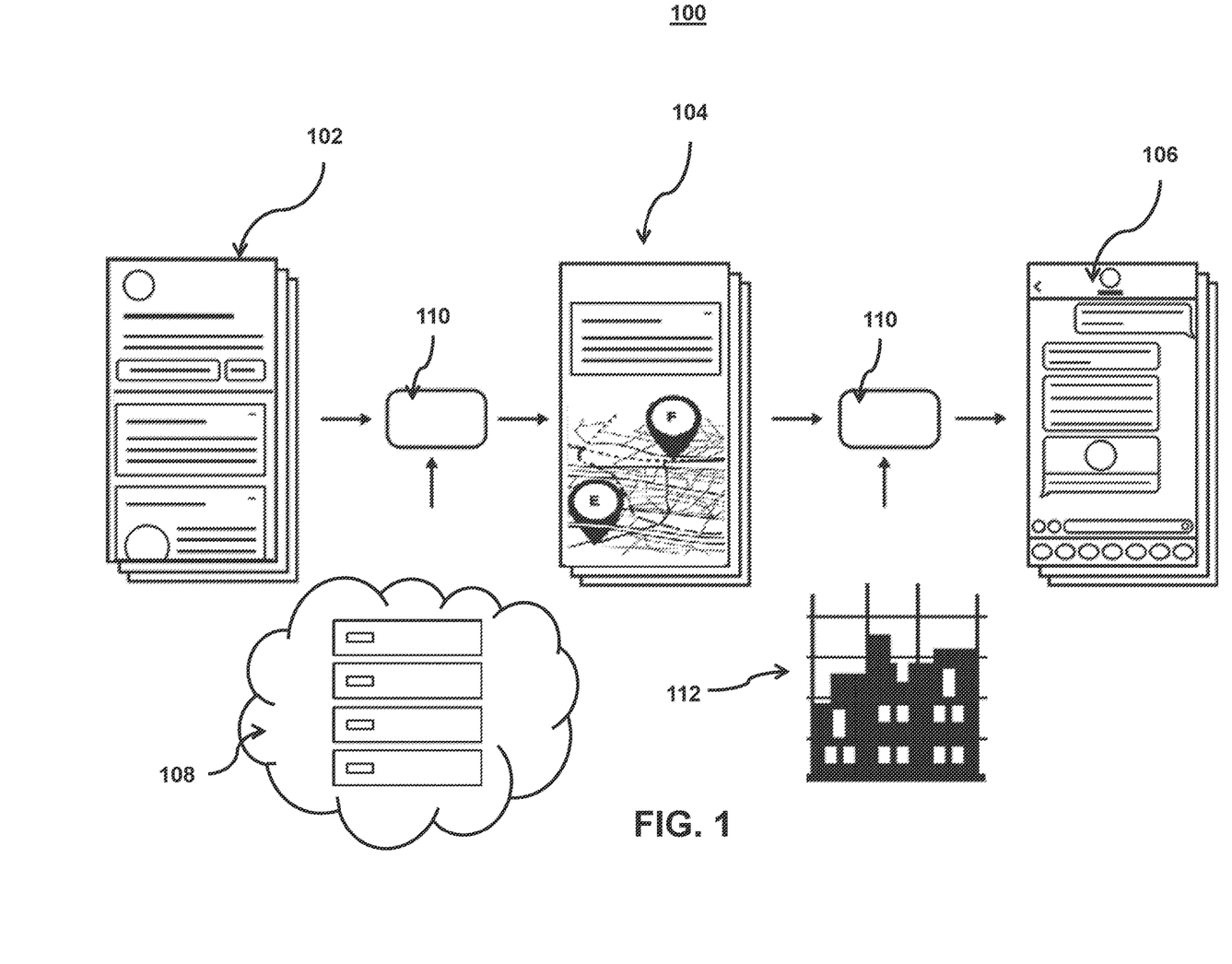
FIG. 1 shows an illustrative system for generating location-based guidance, in accordance with one or more embodiments.

FIG. 1 shows an illustrative system for generating location-based guidance, in accordance with one or more embodiments. For example, FIG. 1 illustrates a progression of activities related to providing location-based recommendations. It should be noted that while the application in diagram 100 is illustrated as a native application as would be presented on a mobile device, embodiments of diagram 100 may apply to other applications and applications types. For example, diagram 100 shows user interface 102. For example, user interface may represent a service registry and management platform. User interface may include a user interface through which a user may request access to, schedule a time interval for performing, and/or otherwise receiving recommendations for location-based guidance. For example, user interface 102 may comprise an interface for a mobile banking application through with the user may receive recommendations about available locations for performing banking services such as ATM withdrawals, applying for loans, etc. The system may present information on the services as well as provide recommendations for times and locations at which a density of users is below a given threshold at each location.

In some embodiments, user interface 102 may include a first set of services. As described herein, a service may include anything provided to a user by software and/or hardware or through an in-person interaction. The system may further distinguish each service by different characteristics of the service. For example, a service may include a distinctive attribute or aspect related to its performance time (e.g., how long the service takes on average), portability (e.g., whether or not it may be performed remotely), and/or whether or not it is performed in-person or through automated means. For example, in some embodiments, a service may be an available function of a program, operating system, and/or device. In some embodiments, the service may be provided as part of an application and/or may be provided as a plug-in, applet, browser extension, and/or other software component for an existing application. For example, the service may be part of an application and/or other program that may be toggled on or off. In another example, the service may be a software component that may be added and/or removed from an application. Alternatively, the service may need to be performed by a user visiting a p[physical location through scheduling an appointment.

User interface 102 may display particular information and/or information of a particular type of service. Alternatively or additionally, each service may be tied to a given function. This function may be a locally performed function (e.g., a function performed on a local device) or this function may be a remotely-executed function. In some embodiments, a service may represent a link to additional information and/or other services, which may be accessed and/or available locally or remotely. In some embodiments, the service may be represented on user interface 102 by textual and/or graphical information.

The system may include a service reference (e.g., metadata or other information that describes the feature). For example, the service reference may include information about the purpose, functions, origin, system requirements (including required formats and/or capabilities), author, recommended use and/or user, related services. The service reference may include a description that may be expressed in a human and/or computer readable language. The service reference may also include a reference or pointer to user profile (e.g., a current or known location of a user, a preferred location of a user, etc.), a location profile (e.g., indicating services available at a location, threshold densities at a location, information used to identify and/or distinguish queening areas for a given service (e.g., floor plans, etc.), geographic profiles (e.g., used for providing travel times and/or route instructions to a location), and/or any other information that may be relevant to the selection and/or use of the feature. The system may retrieve this information and/or compare it to the description in order to select and/or use the service. For example, the description may indicate that the feature uses a particular format and/or displays data in a particular language. The system may retrieve information from a user profile that indicates a device format associated with the user and/or a language setting associated with the user. The system may then determine whether or not the retrieve information corresponds to the description.

The user profile may be stored locally on a user device and/or remote (e.g., at server 108). The user profile may include information about a user and/or device of a user. The information may be generated by actively and/or passively monitoring actions of the user. The user profile may also include information aggregated from one or more sources (including third-party sources). The information in the user profile may include personally identifiable information about a user and may be stored in a secure and/or encrypted manner. The information in the user profile may include information about user settings and/or preferences of the user, activity of the user, demographics of the user, and/or any other information used to target a feature towards a user and/or customize features for a user.

For example, as shown in diagram 100, user interface 102 may allow a user to request access to a first service. The first service (or list of available services) may have been pre-fetched by the system prior to a user activating an application (e.g., a service registry application) that generates the available services for display. The system may pre-fetched this information based on information in the user profile (e.g., a user preference or setting), a predetermined or standard service selection (e.g., by the application), a previously selected service (e.g., a service that was present the last time the application was used), and/or a real-time determination of service registry 110. For example, service registry 110 may continuously, and in real-time, update information about a user. The system may continuously pre-fetch this information and/or may push this information to a local user device and/or edge server for immediate use if an application is activated. Accordingly, the system may minimize delays attributed to populating feature templates and/or providing features and information for features.

It should be noted that as referred to herein, one or more of the components of the system or service registry may be referred to collectively as the "system" and/or the "service registry". For example, in some embodiments, server 108 and service registry 110 may be referred to collectively as the "system" and/or the "service registry".

For example, the system may select a service based on user insights and information on the service (e.g., related metadata) may be streamed to the mobile application prior to the user accessing the mobile application (e.g., at least while the user is logged out) such that the service are presented in the user's landing page (or other mobile application templated page) when the user logs into or otherwise accesses a mobile application comprising the service registry. In another example, an application's available services may be removed or replaced with an alternative service based on the current availability status of the service.

In diagram 100, user interface 102 may include a first link. For example, the link may include a hyperlink. For example, the link may include a link from a hypertext file or document to another location or file, typically activated by clicking on a highlighted word or image on the screen. The link may be an inline link that displays remote content without the need for embedding the content. For example, the inline link may display a modified version of accessible content (e.g., an image, a thumbnail, low resolution preview, cropped section, or magnified section of the accessible content). Alternatively the link may be an anchor link and/or fat link. In some embodiments, the link may be located within a first feature and/or the link may comprise the first feature. In some embodiments, the first link may comprise a push notification. For example, the push notification may have been generated in real-time based on a machine learning model (e.g., machine learning model 202 (FIG. 2)).

In response to a user selection of a link in user interface 102, the system may transmit a service registry request to service registry 110. For example, service registry 110 may comprise a centralized catalog where the system can provide location-based services. Service registry 110 may support meta-data (e.g., descriptions of services), services that are being throttled and/or a level of throttling (e.g., based on current average densities or environmental conditions (e.g., limits to in-person services based on hours of service, government regulations, etc.).

The service registry request may comprise an API request (or call) from one application (e.g., a service registry application implemented on a local device) to an application on a server (e.g., a server implementing service registry 110). The service registry request may include one or more types of information that may be used by the service registry to respond to the service registry request (e.g., changes in availability, density levels, and/or user actions). For example, the service registry request may include information on a function and/or service that a user is requesting, may include information on the user and/or user device, and/or may include information about other services currently available.

For example, in some embodiments, the service registry may create a library to simplify communicating with the API and managing user and session data. The system may therefore support multiple data providers and federated routing development, including better management of application/sub-application routing, consistent capture of usage data about our users to standardize data elements for features, generate consistent and predictable data, and generate a baseline of data for features. Moreover, datasets from different third-party analytics platforms may be prepared such that all of those different third-party analytics data will generate the same results from the same set of data.

For example, in order to accurately provide location-based guidance, the system may need to retrieve information that is dynamically updated from a plurality of sources (e.g., current time, traffic levels, hours of operation, etc.). For example, a third-party provider may have a field called "timeStamp", the feature registry may have a similar field called "dtStamp". The service registry may normalize these types of data and map "dtStamp" value to the "timeStamp" field.

In some embodiments, the system may use a machine learning model (e.g., model 202 as discussed below in relation to FIG. 2) in order to respond to the request. For example, the system may receive the request and access additional information server 108, which may include information on available services and/or user profile information. For example, while the service registry request includes an identity of the user, information from a user profile, and a description of the hyperlinked content, the service registry may supplement this information with additional information about the user from server 108.

For example, server 108 may include a listing of all available services, locations, average densities, and/or may represent a thick computing client for generating location-based guidance based on interior density conditions (e.g., a density and/or average density of a queuing area for a service, queuing areas for all services, a portion of a location, and/or the location itself) at a plurality of locations. The interior density conditions may be constantly changing and/or may be based on information received from a plurality of sources such as mobile applications, sensors/personnel at a given location, third-party data (e.g., traffic management data). Server 108 may manage this information and track respective interior densities in order to accurately provide location-based guidance based on the interior conditions.

In some embodiments, the system may link a user account on service registry 110 to an identify of the user in the request. The system may then supplement the request with additional information on the user from server 108. Additionally or alternatively, the service registry 110 may retrieve additional information on one or more available services (e.g., descriptions of available features, statuses on the availability of the services and/or time intervals for the services, etc.) from server 108 when responding to the request. For example, service registry 110 may use data changes, user actions, environmental conditions (e.g., current air quality, quarantine zones, etc.), user conditions (e.g., preexisting health conditions of the user), and service priorities included in the request to select, arrange, and/or assemble features for a response to the request.

As shown in diagram 100, the system may respond to the service registry request through a service registry response (e.g., a response to the API call comprising the service registry request). The service registry response may comprise one or more available services, time intervals for the services, and/or locations that provide the services. The system may further populate user interface 104 with the one or more services as well as information about the locations and time interval for those locations.

For example, user interface 104 may provide recommendations for performing a requested service as well as a location and directions for reaching the location. The system may then receive a user selection of a given service. The user selection may be transmitted to service registry 110 and service registry 110 may update the available services, locations, and available time intervals based on this information. For example, in response to a user selection request access to a first service, service registry 110 may update an estimated average density of the first queuing area at a location selected by the user. For example, service registry 110 may increase the average density of the first queuing area by one in response to the user selecting the time interval.

Service registry 110 may also receive information from another source (e.g., source 112). Source 112 may represent a third-party source (e.g., a third-party source providing traffic information) or may represent a location-based source. For example, source 112 may represent a sensor and/or personnel at a location that provides actual density, number of users, and/or status information on services at the location (e.g., whether or not a line is forming in a queuing area, whether or not an automated system is down, whether or not a user arrived (or failed to arrive) on schedule.

Based on this information, service registry 110 may transmit a message to a user and/or a mobile device of the user. For example, user interface 106 may represent an alert or push notification sent to a user indicating that the service is not available at the scheduled time interval and/or an average density in a queuing area or location is currently too high. The system may provide a user an alternative time interval and/or provide other instructions.

Figure 2:
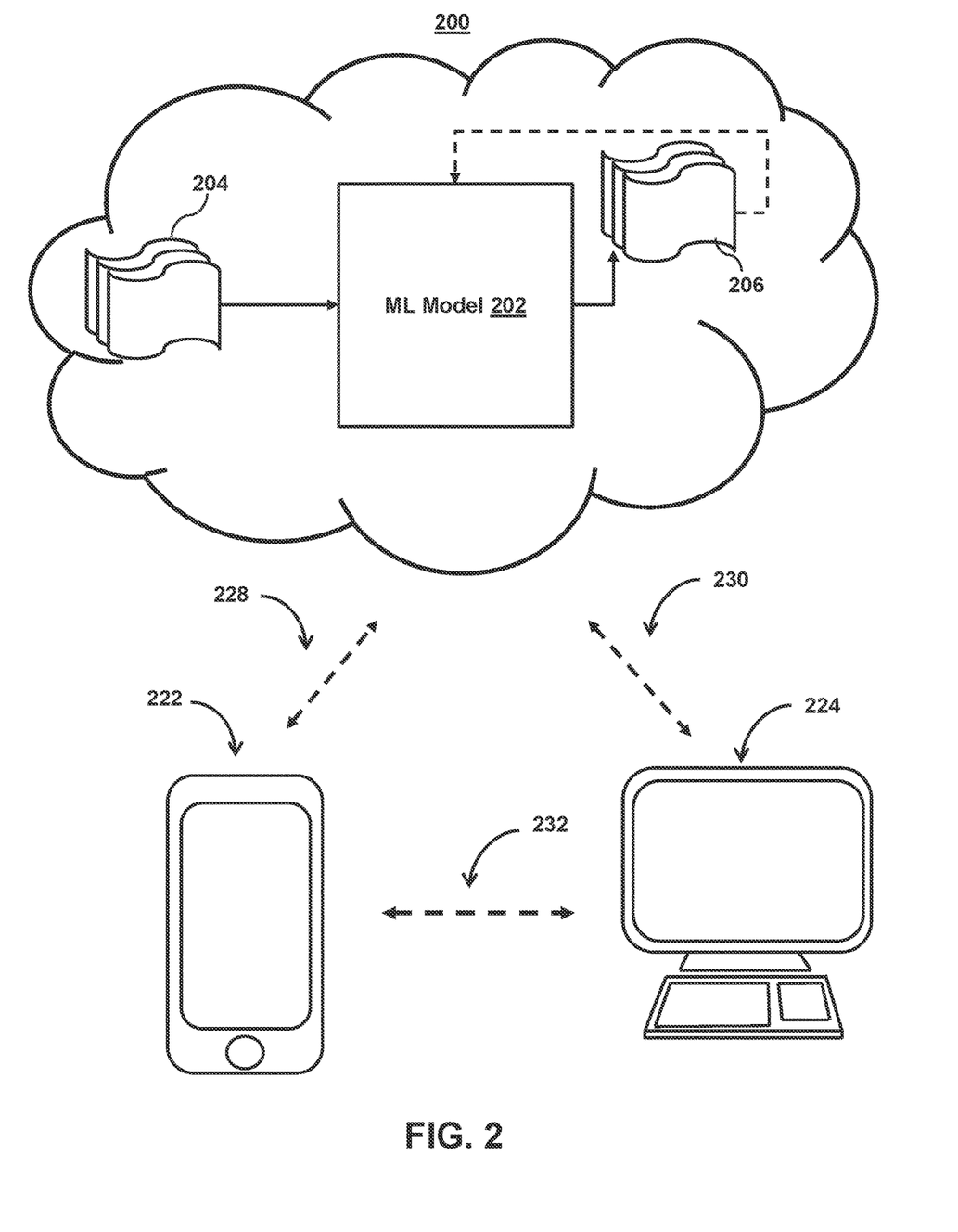
FIG. 2 shows an illustrative system for generating location-based recommendations, in accordance with one or more embodiments.

FIG. 2 shows an illustrative system for generating location-based recommendations, in accordance with one or more embodiments. As shown in FIG. 2, system 200 may include user device 222, user device 224, and/or other components. Each user device may include any type of mobile terminal, fixed terminal, or other device. For example, each of these devices may comprise one or more of the devices shown in FIG. 1. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 102 (FIG. 1)).

By way of example, user device 222 and user device 224 may include a desktop computer, a server, or other client device. Users may, for instance, utilize one or more of the user devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of user device 222, those operations may, in some embodiments, be performed by components of user device 224. System 200 also includes machine learning model 202, which may be implemented on user device 222, user device 224, and/or a cloud-based system, and/or accessible by communication paths 228 and 230, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 4G or LTE network), a cable network, a public switched telephone network, or other types of communications network or combinations of communications networks. Communication paths 228, 230, and 232 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 2, machine learning model 202 may take inputs 204 and provide outputs 206. For example, machine learning model 202 may be used by service registry 110 (FIG. 1)) to receive, from a user device of a user, a user request to access a service. Machine learning model 202 may then be used by service registry 110 (FIG. 1)) to generate for display, on the user device, a recommendation for the location from a subset at which to access the service at a given time interval. For example, machine learning model 202 may be used to efficiently process information on available services, locations, and/or densities in order to provide real-time recommendations.

The inputs may include multiple data sets such as a training data set and a test data set. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, machine learning model 202 may include an artificial neural network. In such embodiments, machine learning model 202 may include input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may correspond to a classification of machine learning model 202 and an input known to correspond to that classification may be input into an input layer of machine learning model 202 during training. During testing, an input without a known classification (e.g., an average density at a location based on given conditions, an ideal location for performing a service based on current conditions, etc.) may be input into the input layer, and a determined classification may be output.

In some embodiments, machine learning model 202 may include multiple layers (e.g., where a signal path traverses from front layers to back layers). In some embodiments, back propagation techniques may be utilized by machine learning model 202 where forward stimulation is used to reset weights on the "front" neural units. In some embodiments, stimulation and inhibition for machine learning model 202 may be more free-flowing, with connections interacting in a more chaotic and complex fashion. During testing, an output layer of machine learning model 202 may indicate whether or not a given input corresponds to a classification of machine learning model 202). Machine learning model 202 may be used by a service registry (e.g., service registry 110 (FIG. 1)) to respond to a service registry request and/or power a location-based recommendation that is generated for display.

Figure 3:
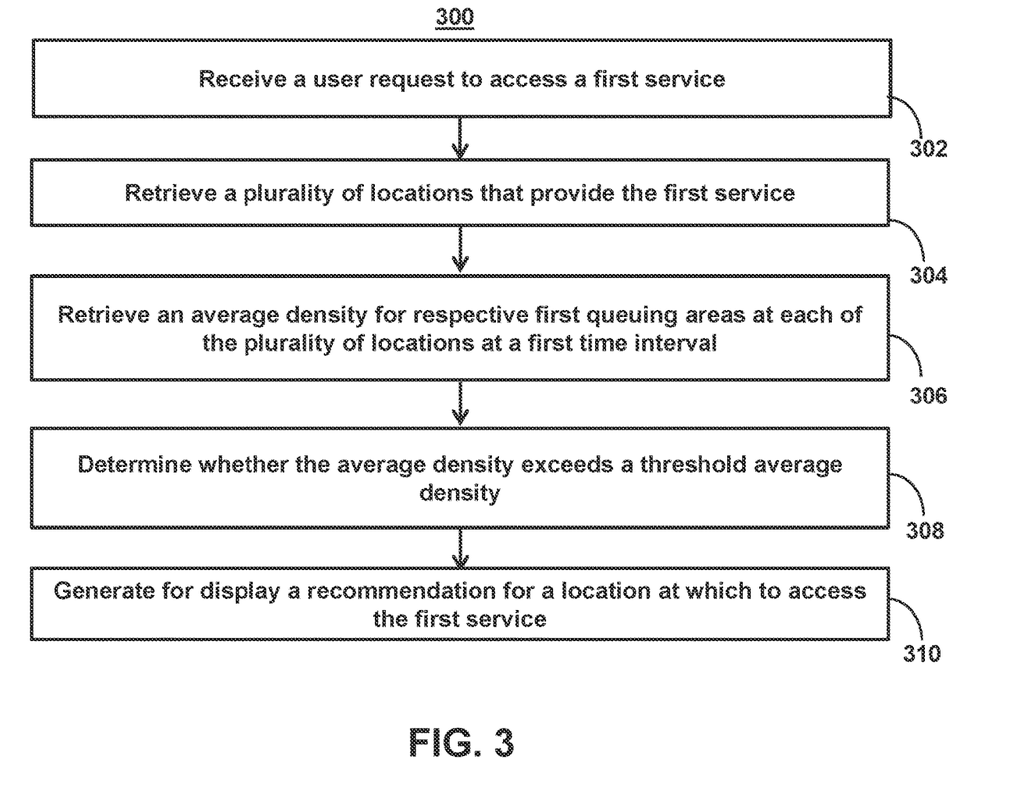
FIG. 3 shows a flowchart of the steps involved in generating location-based guidance based on interior conditions at a plurality of locations, in accordance with one or more embodiments.

FIG. 3 shows a flowchart of the steps involved in generating location-based guidance based on interior conditions at a plurality of locations, in accordance with one or more embodiments. For example, process 300 provides one embodiment of how to generate a recommendation for location-based guidance based on interior conditions at a plurality of locations. In some embodiments, process 300 may be performed by a service registry (e.g., service registry 300) in order to provide location-based guidance based on interior conditions at a plurality of locations.

At step 302, process receives (e.g., via one or more components of FIGS. 1-2) a user request to access a first service. For example, the system may receive, from a user device of a user, a user request to access a first service. For example, the user request may be a request to access a financial service provided by a financial institution.

At step 304, process retrieves (e.g., via one or more components of FIGS. 1-2) a plurality of locations that provide the first service. For example, the system may retrieve a plurality of locations that provide the first service. The system may then filter through these locations based on density. For example, the system may retrieve a list of branches of the financial institution that provides the requested services.

At step 306, process retrieves (e.g., via one or more components of FIGS. 1-2) an average density for respective first queuing areas at each of the plurality of locations at a first time interval. For example, the system retrieve an average density for respective first queuing areas at each of the plurality of locations at a first time interval, wherein the respective first queuing areas correspond to respective portions at each of the plurality of locations reserved for queuing users for the first service.

For example, to retrieve the average density for the respective first queuing areas at each of the plurality of locations at the first time interval, the system may determine respective average wait times for users in the respective first queuing areas at each of the plurality of locations at the first time interval. The system may then determine respective first queuing area sizes for the respective first queuing areas at each of the plurality of locations at the first time interval. The system may then compare the respective average wait times to the respective first queuing area sizes.

In some embodiments, the system may further consider interior conditions at each location. For example, the system may determine respective interior location sizes at each of the plurality of locations (e.g., floor plan square footage). The system may then determine respective interior location maps at each of the plurality of locations, wherein respective interior location maps define the respective first queuing areas at each of the plurality of locations. For example, the system may retrieve marked-up floor plans that include the current layout of queuing areas for different services. The system may then compare the respective interior location sizes and the respective interior location maps.

In some embodiments, the system may further consider a respective number of users accessing the first service at each of the plurality of locations at the first time interval. For example, the system may determine how many total users are at a location irrespective of density. The system may for example limit recommendations of a location upon a predetermined number of users visiting that location during one or more time intervals (e.g., a day).

The system may also receive information from numerous sources. For example, the system may receive communications from a mobile application indicating a user has requested access, but the system may also receive information from a given location. For example, a location may track the number of users that enter its location that did not schedule an appointment (e.g., walk-in users). The system may track this automatically (e.g., using door sensors, cameras, etc.) or through the user of personnel located at the branch (e.g., a welcome agent or customer service representative).

For example, the system may receive a first estimate, from a first source (e.g., a cloud-based server tracking total user requests), of the respective number of users accessing the first service at each of the plurality of locations at the first time interval. The system may then receive a second estimate, from a second source (e.g., a tracker located at the location monitoring walk-in users), of the respective number of users accessing the first service at each of the plurality of locations at the first time interval. The system may then aggregate the first estimate and second estimate to determine an actual density.

At step 308, process determines (e.g., via one or more components of FIGS. 1-2) whether the average density exceeds a threshold average density. For example, the system may determine whether the average density for the respective first queuing areas at each of the plurality of locations at the first time interval exceeds a threshold average density. In some embodiments, the system may select a threshold dynamically or based on a predetermined threshold. For example, the system may determine whether the first service is provided through automated means (e.g., an ATM withdrawal) or an in-person interaction (e.g., requesting a home loan). The system may then select the threshold average density based on whether the first service is provided through automated means or an in-person interaction. For example, if the user is seeking an automated service, the threshold may be lower as the user is less likely to have prolonged contact with other users as queues of users may move faster.

Alternatively or additionally, the system may determine the threshold density based on one or metrics (e.g., a government regulation such as a fire code). For example, the system may modify the threshold based on environmental factors or conditions (e.g., air quality, government regulations, pandemic risks, etc.) as well as internal conditions (e.g., sanitization methods, available sanitation equipment, contact tracing protocols, etc.). The system may also select thresholds based on a user and/or a user selection (e.g., a user with pre-existing medical conditions may request and/or be assigned only locations meeting strict thresholds (i.e., thresholds corresponding to a low density)).

At step 310, process generates (e.g., via one or more components of FIGS. 1-2) for display a recommendation for a location at which to access the first service. For example, the system may generate for display, on the user device, a recommendation for a location from the subset at which to access the first service at the first time interval in response to determining a subset of the plurality of locations where the average density for the respective first queuing areas at the first time interval exceed the threshold average density.

In some embodiments, the system may take no action if the average density does not exceed the threshold average density. Alternatively, the system may recommend another time interval and/or location. For example, in response to determining that there is no subset of the plurality of locations where the average density for the respective first queuing areas at the first time interval exceeds the threshold average density, retrieving an average density for respective first queuing areas at each of the plurality of locations at a second time interval. The system may then determine whether the average density for the respective first queuing areas at each of the plurality of locations at the second time interval exceeds the threshold average density.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 3.

Figure 4:
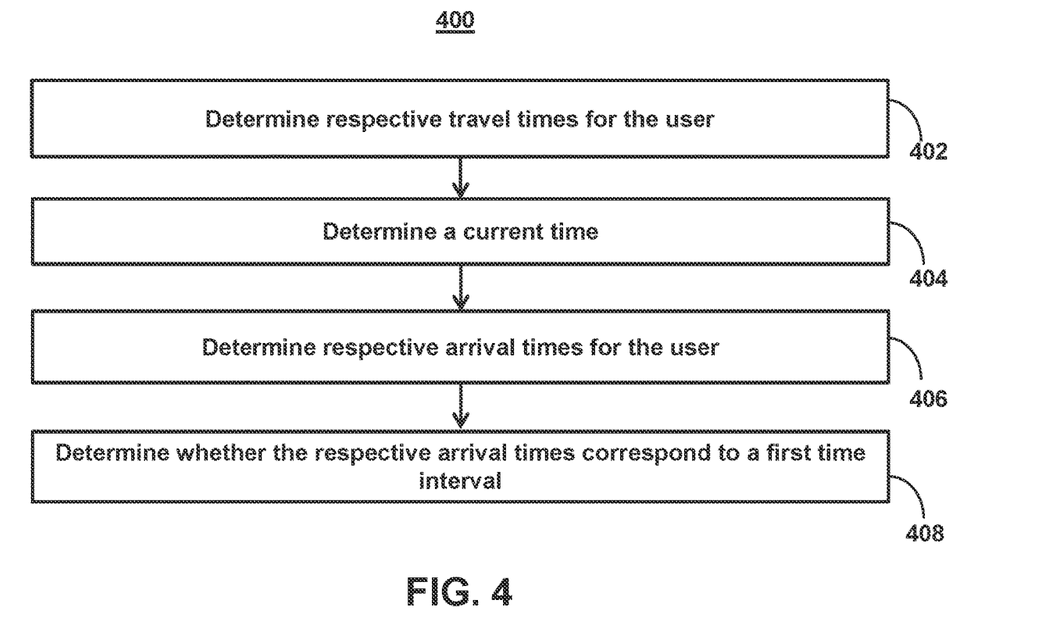
FIG. 4 shows a flowchart of the steps involved in determining whether respective arrival times of a user correspond to a first time interval, in accordance with one or more embodiments.

FIG. 4 shows a flowchart of the steps involved in determining whether respective arrival times of a user correspond to a first time interval, in accordance with one or more embodiments.

At step 402, process determines (e.g., via one or more components of FIGS. 1-2) respective travel times for the user. For example, the system may determine respective travel times for the user to each location of the subset (e.g., as determined in FIG. 3). For example, the system may determine whether or not, based on a current location and time, if a user is able to reach the location at a selected time interval (e.g., a time interval as discussed in FIG. 3 above).

At step 404, process determines (e.g., via one or more components of FIGS. 1-2) a current time. For example, the system may determine the time at which a user requested access a first service (e.g., as described in FIG. 3). For example, the system may retrieve a current time from an internal clock of a mobile device upon which it is implement and/or from a remote server that provides a current date/time.

At step 406, process determines (e.g., via one or more components of FIGS. 1-2) respective arrival times for the user. For example, the system may determine respective arrival times for the user to each location of the subset based on the respective travel times and the current time. For example, the system may determine the number of hours and minutes it will take a user to arrive at location based on a number of miles, current travel conditions (e.g., weather, traffic, etc.), type of transportation (e.g., car, bus, walking, etc.) and/or the average speed the user. The system may also estimate fuel costs and/or whether or not the directions cause the user to travel through an area with special characteristics (e.g., an area of high contamination, poor air quality, etc.). The system may also indicate what date and time you will arrive at the location—including any time zone variations and/or what effects driving faster or slower will have on the arrival time.

At step 408, process determines (e.g., via one or more components of FIGS. 1-2) whether the respective arrival times correspond to a first time interval. For example, the system may filter each location of the subset based on whether its respective arrival time corresponds to the first time interval. If the system determines that the arrival time does corresponds, the system may recommend the location. If the system determines that the arrival time does not correspond, the system may recommend a different location, time interval (e.g., an interval later in the day), and/or allow a user to select a future time interval from an available list.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 4.

Figure 5:
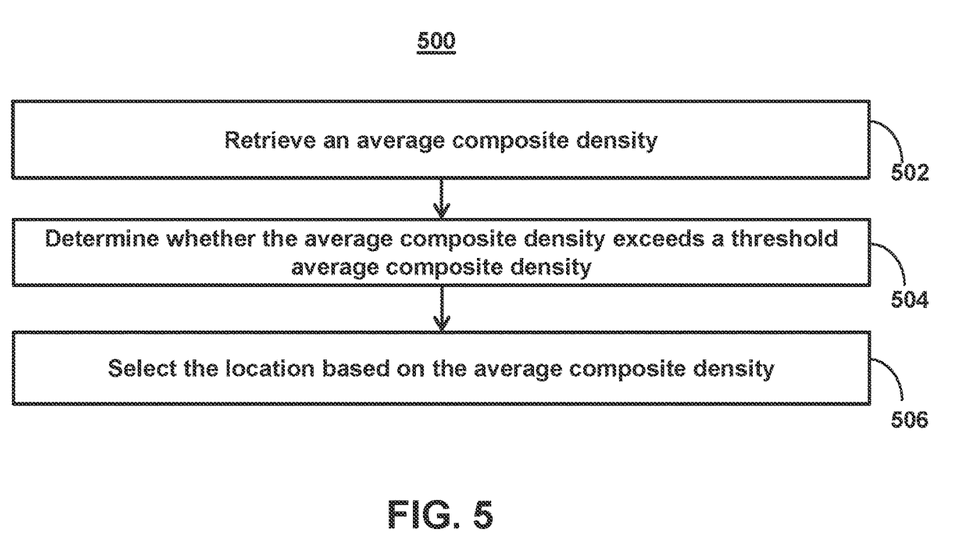
FIG. 5 shows flowchart of the steps involved in selecting a location based on an average composite density, in accordance with one or more embodiments.

FIG. 5 shows flowchart of the steps involved in selecting a location based on an average composite density, in accordance with one or more embodiments.

At step 502, process retrieves (e.g., via one or more components of FIGS. 1-2) an average composite density. For example, the system may retrieve an average composite density for all services at each of the plurality of locations at the first time interval. In such cases, the system may determine whether the average density for the respective first queuing areas at each of the plurality of locations at the first time interval exceeds a threshold average density and determine whether the average density for a respective second queuing areas at each of the plurality of locations at the first time interval exceeds a threshold average density. The system may then select a location based on whether or not one or more of the average densities exceeds a threshold average density. Alternatively, or additionally, the system may determine an average density for all queues in a location and compare the average density to a threshold density for all services.

At step 504, process determines (e.g., via one or more components of FIGS. 1-2) whether the average composite density exceeds a threshold average composite density. For example, the system may determine whether the average composite density at each of the plurality of locations at the first time interval exceeds a threshold average composite density. The system may determine the threshold average composite density based on one or metrics (e.g., a government regulation such as a fire code). The system may also dynamically update the threshold average composite density. For example, the system may modify the threshold average composite density based on environmental factors or conditions (e.g., air quality, government regulations, pandemic risks, etc.) as well as internal conditions (e.g., sanitization methods, available sanitation equipment, contact tracing protocols, etc.). The system may also select thresholds based on a user and/or a user selection (e.g., a user with pre-existing medical conditions may request and/ or be assigned only locations meeting strict thresholds (i.e., thresholds corresponding to a low density)).

At step 506, process selects (e.g., via one or more components of FIGS. 1-2) the location based on the average composite density. For example, the system may select the location based on the average composite density exceeding the threshold average composite density. In some embodiments, the system may compare the average composite density to one or more thresholds. Each threshold may be related to a rank and/or other metric any may determine whether or not a location gets selected.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating location-based guidance based on interior density conditions at a plurality of locations, the method comprising: receiving, from a user device of a user, a user request to access a first service; retrieving a plurality of locations that provide the first service; retrieving an average density for respective first queuing areas at each of the plurality of locations at a first time interval, wherein the respective first queuing areas correspond to respective portions at each of the plurality of locations reserved for queuing users for the first service; determining whether the average density for the respective first queuing areas at each of the plurality of locations at the first time interval exceeds a threshold average density; in response to determining a subset of the plurality of locations where the average density for the respective first queuing areas at the first time interval exceed the threshold average density, generating for display, on the user device, a recommendation for a location from the subset at which to access the first service at the first time interval.

2. The method of embodiment 1, further comprising: determining whether the first service is provided through automated means or an in-person interaction; and selecting the threshold average density based on whether the first service is provided through automated means or an in-person interaction.

3. The method of embodiments 1-2, further comprising: in response to determining that there is no subset of the plurality of locations where the average density for the respective first queuing areas at the first time interval exceeds the threshold average density, retrieving an average density for respective first queuing areas at each of the plurality of locations at a second time interval; and determining whether the average density for the respective first queuing areas at each of the plurality of locations at the second time interval exceeds the threshold average density.

4. The method of embodiments 1-3, further comprising: determining respective travel times for the user to each location of the subset; and selecting the location having a lowest respective travel time.

5. The method of embodiments 1-4, further comprising: determining respective travel times for the user to each location of the subset; determining a current time; determining respective arrival times for the user to each location of the subset based on the respective travel times and the current time; and filtering each location of the subset based on whether its respective arrival time corresponds to the first time interval.

6. The method of embodiments 1-5, wherein retrieving the average density for the respective first queuing areas at each of the plurality of locations at the first time interval, comprises: determining respective average wait times for users in the respective first queuing areas at each of the plurality of locations at the first time interval; determining respective first queuing area sizes for the respective first queuing areas at each of the plurality of locations at the first time interval; and comparing the respective average wait times to the respective first queuing area sizes.

7. The method of embodiment 7, wherein determining the respective first queuing area sizes further comprises: determining respective interior location sizes at each of the plurality of locations; determining respective interior location maps at each of the plurality of locations, wherein respective interior location maps define the respective first queuing areas at each of the plurality of locations; and comparing the respective interior location sizes and the respective interior location maps.

8. The method of embodiments 1-7, wherein retrieving the average density for respective first queuing areas at each of the plurality of locations at a first time interval, further comprises determining a respective number of users accessing the first service at each of the plurality of locations at the first time interval.

9. The method of embodiment 8, wherein determining the respective number of users accessing the first service at each of the plurality of locations at the first time interval, further comprises: receiving a first estimate, from a first source, of the respective number of users accessing the first service at each of the plurality of locations at the first time interval; receiving a second estimate, from a second source, of the respective number of users accessing the first service at each of the plurality of locations at the first time interval; and aggregating the first estimate and second estimate.

10. The method of embodiments 1-9, further comprising: retrieving an average composite density for all services at each of the plurality of locations at the first time interval; determining whether the average composite density at each of the plurality of locations at the first time interval exceeds a threshold average composite density; and selecting the location based on the average composite density exceeding the threshold average composite density.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for generating location-based guidance based on interior density conditions and travel times, the system comprising:
cloud-based memory configured to store a plurality of locations;
cloud-based control circuitry configured to:
receive, from a user device of a user, a user request to access a first service;
retrieve the plurality of locations that provide the first service;
retrieve an average density for respective first queuing areas at each of the plurality of locations at a first time interval, wherein the respective first queuing areas correspond to respective interior locations at each of the plurality of locations reserved for queuing users for the first service;
determine respective travel times for the user to each location of the plurality of locations; and
select a location from the plurality of locations based on the average density for the respective first queuing areas and the respective travel times; and
cloud-based input/output circuitry configured to:
generate for display, on the user device, a recommendation for the location.

2. A method for generating location-based guidance based on interior density conditions and travel times, the method comprising:
receiving, from a user device of a user, a user request to access a first service;
retrieving, using control circuitry, a plurality of locations that provide the first service;
retrieving, using the control circuitry, an average density for respective first queuing areas at each of the plurality of locations at a first time interval, wherein the respective first queuing areas correspond to respective interior locations at each of the plurality of locations reserved for queuing users for the first service;
determining, using the control circuitry, respective travel times for the user to each location of the plurality of locations;
selecting, using the control circuitry, a location from the plurality of locations based on the average density for the respective first queuing areas and the respective travel times; and
generating for display, on the user device, a recommendation for the location.

3. The method of claim 2, further comprising:
determining whether the first service is provided through automated means or an in-person interaction; and
selecting a threshold average density based on whether the first service is provided through automated means or an in-person interaction.

4. The method of claim 2, further comprising:
determining whether the average density for the respective first queuing areas at each of the plurality of locations at the first time interval exceeds a threshold average density;
in response to determining that there is no subset of the plurality of locations where the average density for the respective first queuing areas at the first time interval exceeds the threshold average density, retrieving an average density for respective first queuing areas at each of the plurality of locations at a second time interval; and
determining whether the average density for the respective first queuing areas at each of the plurality of locations at the second time interval exceeds the threshold average density.

5. The method of claim 2, further comprising:
determining whether the average density for the respective first queuing areas at each of the plurality of locations at the first time interval exceeds a threshold average density; and
in response to determining a subset of the plurality of locations where the average density for the respective first queuing areas at the first time interval exceed the threshold average density, determining to generate for display, on the user device, the recommendation for the location.

6. The method of claim 2, further comprising:
determining a current time;
determining respective arrival times for the user to each location based on the respective travel times and the current time; and
filtering each location based on whether its respective arrival time corresponds to the first time interval.

7. The method of claim 2, wherein retrieving the average density for the respective first queuing areas at each of the plurality of locations at the first time interval, comprises:
determining respective average wait times for users in the respective first queuing areas at each of the plurality of locations at the first time interval;
determining respective first queuing area sizes for the respective first queuing areas at each of the plurality of locations at the first time interval; and
comparing the respective average wait times to the respective first queuing area sizes.

8. The method of claim 7, wherein determining the respective first queuing area sizes further comprises:
determining respective interior location sizes at each of the plurality of locations;
determining respective interior location maps at each of the plurality of locations, wherein respective interior location maps define the respective first queuing areas at each of the plurality of locations; and
comparing the respective interior location sizes and the respective interior location maps.

9. The method of claim 2, wherein retrieving the average density for respective first queuing areas at each of the plurality of locations at the first time interval, further comprises determining a respective number of users accessing the first service at each of the plurality of locations at the first time interval.

10. The method of claim 9, wherein determining the respective number of users accessing the first service at each of the plurality of locations at the first time interval, further comprises:
receiving a first estimate, from a first source, of the respective number of users accessing the first service at each of the plurality of locations at the first time interval;
receiving a second estimate, from a second source, of the respective number of users accessing the first service at each of the plurality of locations at the first time interval; and
aggregating the first estimate and the second estimate.

11. The method of claim 2, further comprising:
retrieving an average composite density for all services at each of the plurality of locations at the first time interval;
determining whether the average composite density at each of the plurality of locations at the first time interval exceeds a threshold average composite density; and
selecting the location based on the average composite density exceeding the threshold average composite density.

12. A non-transitory computer-readable media comprising instructions that, when executed by one or more processors, cause operations comprising:
receiving, from a user device of a user, a user request to access a first service;
retrieving a plurality of locations that provide the first service;
retrieving an average density for respective first queuing areas at each of the plurality of locations at a first time interval, wherein the respective first queuing areas correspond to respective interior locations at each of the plurality of locations reserved for queuing users for the first service;
determining respective travel times for the user to each location of the plurality of locations;
selecting a location from the plurality of locations based on the average density for the respective first queuing areas and the respective travel times; and
generating for display, on the user device, a recommendation for the location.

13. The non-transitory computer-readable media of claim 12, wherein the instructions further cause operations comprising:
determining whether the first service is provided through automated means or an in-person interaction; and
selecting a threshold average density based on whether the first service is provided through automated means or an in-person interaction.

14. The non-transitory computer-readable media of claim 12, wherein the instructions further cause operations comprising:
determining whether the average density for the respective first queuing areas at each of the plurality of locations at the first time interval exceeds a threshold average density;
in response to determining that there is no subset of the plurality of locations where the average density for the respective first queuing areas at the first time interval exceeds the threshold average density, retrieving an average density for respective first queuing areas at each of the plurality of locations at a second time interval; and
determining whether the average density for the respective first queuing areas at each of the plurality of locations at the second time interval exceeds the threshold average density.

15. The non-transitory computer-readable media of claim 12, wherein the instructions further cause operations comprising:
selecting the location having a lowest respective travel time.

16. The non-transitory computer-readable media of claim 12, wherein the instructions further cause operations comprising:
determining a current time;
determining respective arrival times for the user to each location based on the respective travel times and the current time; and
filtering each location based on whether its respective arrival time corresponds to the first time interval.

17. The non-transitory computer-readable media of claim 12, wherein retrieving the average density for the respective first queuing areas at each of the plurality of locations at the first time interval, comprises:
determining respective average wait times for users in the respective first queuing areas at each of the plurality of locations at the first time interval;
determining respective first queuing area sizes for the respective first queuing areas at each of the plurality of locations at the first time interval; and
comparing the respective average wait times to the respective first queuing area sizes.

18. The non-transitory computer-readable media of claim 17, wherein determining the respective first queuing area sizes further comprises:
   determining respective interior location sizes at each of the plurality of locations;
   determining respective interior location maps at each of the plurality of locations, wherein respective interior location maps define the respective first queuing areas at each of the plurality of locations; and
   comparing the respective interior location sizes and the respective interior location maps.

19. The non-transitory computer-readable media of claim 12, wherein retrieving the average density for respective first queuing areas at each of the plurality of locations at the first time interval, further comprises determining a respective number of users accessing the first service at each of the plurality of locations at the first time interval.

20. The non-transitory computer-readable media of claim 19, wherein determining the respective number of users accessing the first service at each of the plurality of locations at the first time interval, further comprises:
   receiving a first estimate, from a first source, of the respective number of users accessing the first service at each of the plurality of locations at the first time interval;
   receiving a second estimate, from a second source, of the respective number of users accessing the first service at each of the plurality of locations at the first time interval; and
   aggregating the first estimate and second estimate.

* * * * *